United States Patent [19]
Menzel

[11] Patent Number: 5,900,550
[45] Date of Patent: May 4, 1999

[54] CAPACITIVE ACCELERATION SENSOR

[75] Inventor: Christoph P. Menzel, Monument, Colo.

[73] Assignee: Ford Motor Company, Dearborn, Mich.

[21] Appl. No.: 08/876,575

[22] Filed: Jun. 16, 1997

[51] Int. Cl.⁶ .............................................. G01P 15/125
[52] U.S. Cl. .................................... 73/514.32; 73/514.29
[58] Field of Search ........................... 73/514.32, 514.36, 73/514.29, 514.21, 514.16; 361/280, 283.1

[56] References Cited

U.S. PATENT DOCUMENTS

| | | | |
|---|---|---|---|
| 4,736,629 | 4/1988 | Cole | 73/517 R |
| 5,028,876 | 7/1991 | Cadwell | 73/724 |
| 5,205,171 | 4/1993 | O'Brien et al. | 73/514.18 |
| 5,220,835 | 6/1993 | Stephan | 73/514.32 |
| 5,404,749 | 4/1995 | Spangler | 73/514.32 |
| 5,448,864 | 9/1995 | Stephan | 73/514.32 |
| 5,581,035 | 12/1996 | Greiff | 73/514.32 |

FOREIGN PATENT DOCUMENTS

| | | | |
|---|---|---|---|
| 1620-944 | 1/1991 | U.S.S.R. | 73/514.32 |

*Primary Examiner*—Michael Brock
*Assistant Examiner*—Helen C. Kwok
*Attorney, Agent, or Firm*—Peter Abolins

[57] ABSTRACT

An accelerometer includes an axis about which opposing sides having different mass and different capacitor plates sizes move in response to acceleration. The different size of capacitor plate improves linearity of the capacitor sensing structure.

2 Claims, 2 Drawing Sheets

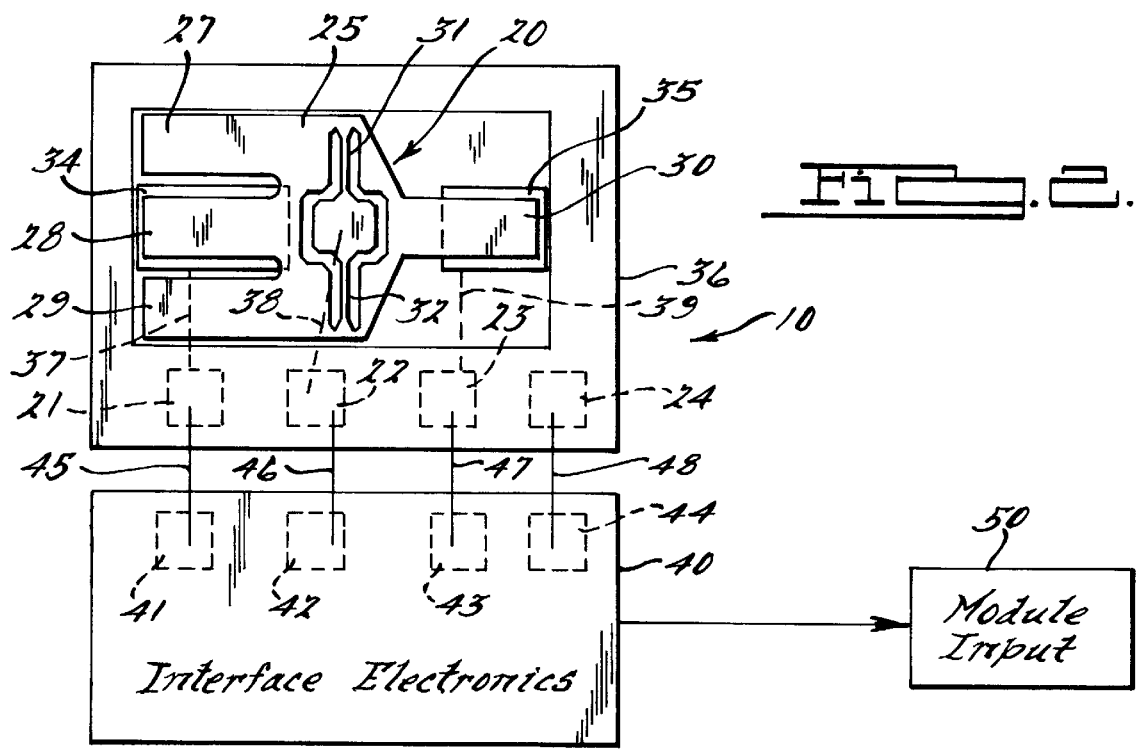
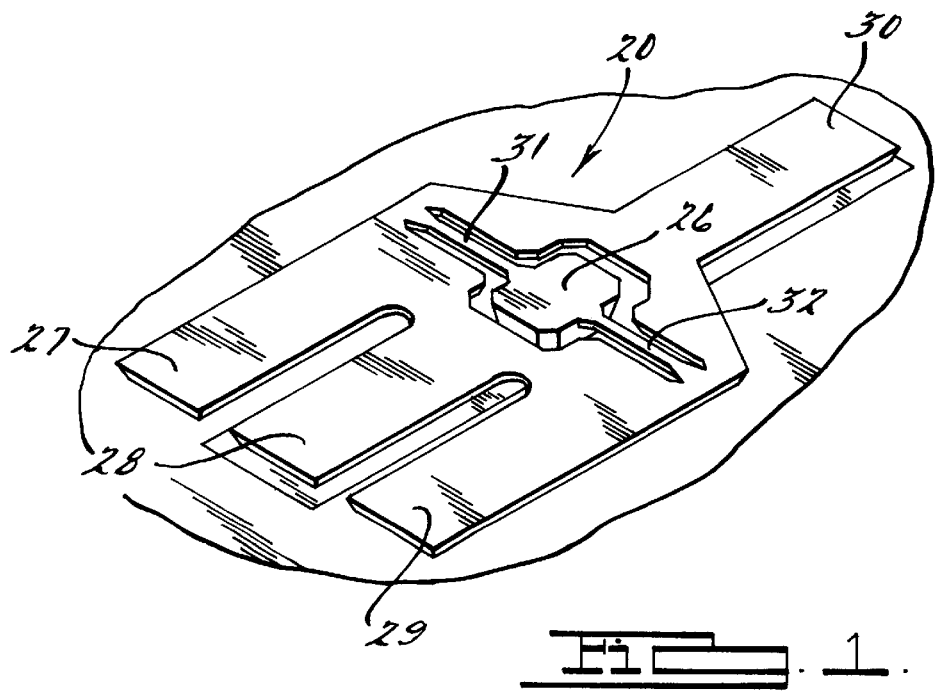

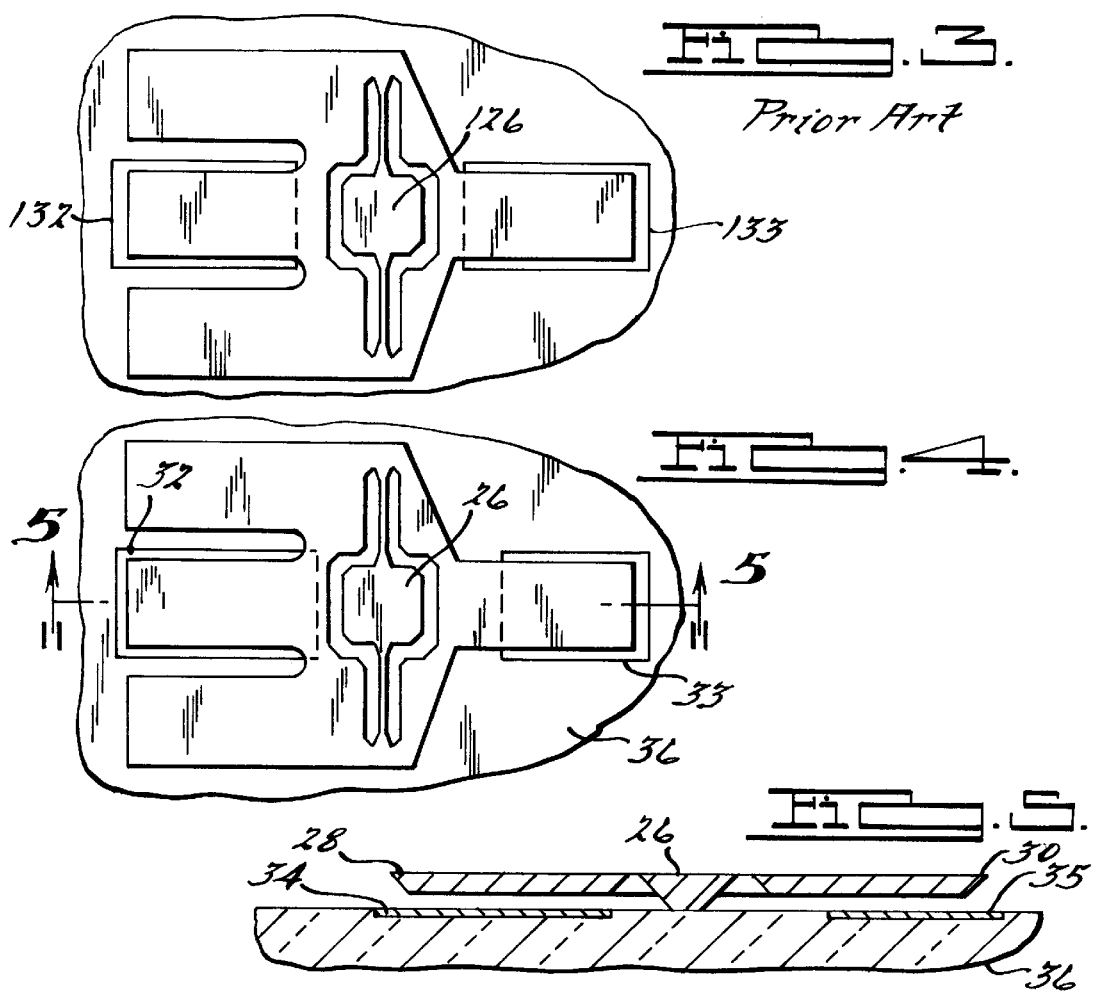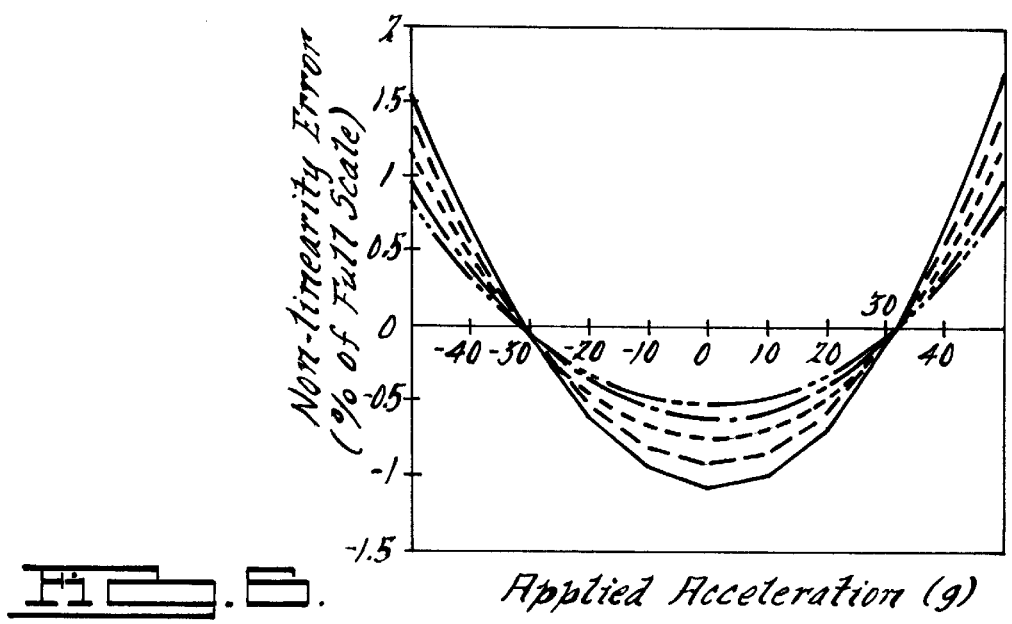

CAPACITIVE ACCELERATION SENSOR

BACKGROUND OF THE INVENTION

1. Field of the Invention

This invention relates to sensors having relatively movable capacitor plates.

2. Prior Art

It is known to have an acceleration sensor using a movable plate that moves rotationally above a fixed plate about a torsion spring. Because of the torsional nature of the spring, under accelerations, one side of the movable plate is moved further away from the fixed plate while the other side of the movable plate moves closer to the fixed plate. By applying a voltage between a movable plate and the metal on the fixed plate, the separation distance between the plates can be determined by a capacitance measurement.

These two capacitances, measured as CA and CB, are converted into an electrical signal. In this embodiment, mechanical to capacitance transduction is defined by DelC= (CA−CB)/(CA+CB). The forces generated by the voltages used to measure the separation distance between the plates perturbs the system significantly. The result being that the final steady-state position of the moveable plate is determined by the value of the applied acceleration and the applied sensing voltages. Since the voltage force is proportional to the inverse of the plate separation squared, $(1/\text{separation})^2$, the size of the voltage effect is a nonconstant and nonlinear function of the applied g force. This nonconstant force in turn causes the expression of DelC to be nonlinear with respect to acceleration.

Micro-miniature, solid-state accelerometers are used for a number of important applications such as acceleration sensors in missile safe and arm devices. One prior solid-state accelerometer comprises a mass supported by a silicon beam upon which one or more piezoresistive sensing elements are formed. Under acceleration, the restoring force exerted by the beam on the mass induces stress in the sensing element. The resistance of the sensing element changes with the stress, and the change in resistance is converted to a differential voltage by using one or two sensing elements in a resistance bridge circuit.

Other known prior art includes U.S. Pat. Nos. 4,736,629 (Cole), and 5,028,876 (Cadwell).

It would be desirable to optimize the linearity of such a device without changing other functionality of the device. Known methods of changing linearity of the device have some significant effect on other functional parameters of the design. These are some of the problems this invention overcomes.

SUMMARY OF THE INVENTION

An embodiment of this invention uses a deliberate mismatching of the two sensor capacitors in an open loop differential capacitive sensor to compensate for nonlinearities in the device's function. Studies have shown there is an advantageous relationship between the mismatch and the functions of the acceleration sensing device. Applicant's invention includes the deliberate mismatching of the nominal values of two capacitors CA and CB. A mismatch ratio can be defined as CA/CB. If these two capacitors are of significantly different values, then, as the device tilts, the denominator $(CA+CB)=(CA_{nom}+CB_{nom}+dCA-dCB)$ does not remain constant. By selecting the ratio of the nominal values of CA and CB, the linearity of DelC in the presence of the sense voltage can be established by design.

Accordingly, Applicant's invention includes a way of linearizing the output of a capacitor sensor. Applicant's invention can have applicability to a wide variety of sensors.

BRIEF DESCRIPTION OF THE DRAWINGS

FIG. 1 is a perspective view of a capacitive sensor in accordance with an embodiment of this invention.

FIG. 2 is a schematic plan view of a capacitive sensor with associated electronic processing in accordance with an embodiment with this invention.

FIG. 3 is an enlarged plan view of a capacitive element of a capacitor sensor in accordance with the prior art.

FIG. 4 is a view similar to FIG. 3 of the capacitive element in accordance with an embodiment of this invention.

FIG. 5 is a side cross sectional view of a capacitive sensor in accordance with an embodiment with this invention.

FIG. 6 is a graphical representation of nonlinearity error versus applied acceleration at different capacitive plate size mis-matching.

DETAILED DESCRIPTION OF THE PREFERRED EMBODIMENT

Referring to FIGS. 1 and 2, a capacitive sensor assembly 10 includes a capacitor sensor, interface electronics 40, and a module input for processing information 50. Interface electronics 40 has bond pads 41, 42, 43, and 44 from which are connected metal bond wires 45, 46, 47, and 48, respectively. Bond wires 45, 46, 47, and 48 are connected to bond pads 21, 22, 23, and 24 on capacitor sensor 20. Capacitor sensor 20 includes a capacitive element 25 having a central portion 26 and, extending in a first direction, triple ends 27, 28 and 29 (CA). Opposing triple ends 27, 28, and 29, extending in an opposite direction, is single end 30 (CD). Central portion 26 is connected to the remainder of capacitive element 25 by a pair of torsional beams 31 and 32 which permit the remainder of capacitive element 25 to twist with respect to central portion 26. The bottom surfaces of capacitor plate ends 28 and 30 are capacitive electrodes which oppose another set of electrodes, plates 34 and 35 formed on the glass substrate 36.

Capacitor plate 34 is connected to bond pad 21 by a lead 37. Central portion 26 is connected to bond pad 22 by a lead 38. Capacitor plate 35 is connected to a bond pad 23 by a lead 39.

Referring to FIG. 3, there is shown a prior art structure analogous to Applicant's invention shown in FIG. 1, and analogous members are shown with numbering having a 1 in front of them. However, capacitor plate 132 is the same size as capacitive plate 133. This is in contrast to Applicant's invention, shown in greater detail in FIG. 4, wherein plate 34 is larger than plate 35. This mismatch between the two capacitor plates produces an advantageous linearity in sensor operation.

Referring to FIG. 5, it is shown that central portion 26 is thicker than capacitor plate ends 27, 28, 29, and 30 so that capacitor plate ends 27, 28, 29, and 30 are spaced from glass substrate 36 and capacitor plate 28 is spaced from capacitor plate 34 on glass substrate 36, and capacitor plate end 30 is spaced from capacitor plate 35 on substrate 36.

Referring to FIG. 6, the graphical presentation of nonlinearity error versus applied acceleration for different capacitive plate size mismatching at different mismatch ratios shows that mismatching causes improvement relative to matching the capacitor plates. The non-linearity error is the difference between the sensors actual output at an acceleration and the best fit straight line through the set of all output, acceleration data pairs. A nonlinearity of zero is desired.

The embodiment presented herein has found applicability on the transducer of accelerometers used within automotive airbag systems. While automotive linearity requirements are not particularly stringent (~1% of full scale), the high volume production and 6σ goals of automotive manufacturing require tight tolerances. The transducer is a centrally tethered, two beam capacitive device. The heavy/light mass ratio is approximately 3:1. Differential capacitors are formed by independent, stationary metal electrodes underneath the heavy and light sides of the single crystal silicon structure.

The interface electrical circuit provides a delta-sigma pulse steam proportional to τ=(CA−CB)/(CA+CB), where CA and CB are the heavy and light side capacitance values, respectively. Switching voltage levels applied to the stationary electrodes transfer charge on-to (off-of) the heavy (light) sides of the element. The charge flow is analyzed by a first order "charge mode" delta-sigma modulator. The output frequency is proportional to the total amount of charge transferred, which in turn is dependent, through the capacitance, on the deflection of the plate caused by acceleration. The voltage transitions are set using EEOROM, and hence, by setting the magnitude of the transitions, the product can be fully calibrated for zero-g output and gain.

The sensor system is an open loop system. Maximum deflections and electrical gain parameters are designed to function in the 10% deflection range at 50 g full scale. In addition, the system architecture requires that the transducer provide mechanical filtering in the 400 Hz range.

The sources of nonlinearity in a differential torsional capacitive system can be listed. The primary contributors are: 1) large deflections, i.e., deviations from Hooke's law resulting only from the size of the deflection; 2) the nonlinear nature of $\partial Cap/\partial gap$ within a system where $\partial gap/\partial accel$ is linear; 3) common mode signals; and 4) "extra" systematic forces, e.g., sensing voltage forces.

In accordance with an embodiment of this invention, designing a reduced linearity error device involves making the heavy side capacitor larger than the light side capacitor. This change makes (CA+CB) non-zero even if no common mode displacement occurs. As the element deflects, the denominator of $$\frac{CA-CB}{CA+CB}$$

gets bigger and works with the common mode deflection to offset the nonlinearity caused by the sensing voltage.

In practice, making the heavy side stationary metal plate a different area than the light side stationary metal achieves any arbitrary mismatch ratio. No change in the element structure is required. So AC response, robustness, and fabrication processes are not changed. Furthermore, the DC response of the device is not reduced, and signal to noise ratio need not be compromised.

Modeling has confirmed that the design change reduces the linearity error. In addition, it is determined approximately what level of mismatch was needed given the design's inherent common mode deflections and that no other device outputs were significantly effected. Modeling was done using computer model that converts geometry into a mass/spring system, performs the device calibration process, and then "test" the device at various accelerations. All calculations included sensing voltage effects.

Mismatched capacitance reduces linearity error by about 50% without causing a significant change in the value of other performance parameters. Results also indicate there does not appear to be a need for a trade-off to obtain the benefits of capacitation mismatch. An advantageous ratio for mismatch is the ratio of a range of about 1.2 to about 1.3 (to 1).

Various modification and variations will no doubt occur to those skilled in the art to which this invention pertains. Such variations and modifications which basically rely on the teaching through which this disclosure advanced the art are properly considered within the scope of this invention.

I claim:

1. An accelerometer, including:

a substrate;

a sensing element having a metallic member;

mounting means positioned between said sensing element and said substrate so that the sensing element is positioned adjacent the substrate, whereby acceleration normal to the substrate tends to move the sensing element;

means for sensing movement of the sensing element including a first metallic electrode mounted on the substrate below the sensing element and a second, electrically independent metallic electrode also mounted below the sensing element wherein the size of the first and second metallic electrodes are unequal;

said sensing element includes an internal opening;

said mounting means are positioned within said opening for mounting the sensing element so that the sensing element is positioned above the substrate and can rotate about a torsional axis that is above and substantially parallel to the substrate, the mounting means comprising a pedestal mounted to the substrate and flexible support means for providing a connection between the sensing element and the pedestal, the support means comprising a beam extending between the sensing element and pedestal in a direction parallel to the sensing element and substrate and perpendicular to the torsional axis, the torsional axis dividing the sensing element into a first section on one side of the torsional axis and a second section on the opposite side of the torsional axis from the first section, the total moments of the first and second sections about the torsional axis being different from one another, whereby acceleration normal to the substrate tends to rotate the sensing element about the torsional axis; and means for sensing rotation of the sensing element about the torsional axis including a first capacitor formed by the first section of the element and the first metallic electrode mounted on the substrate, below the first section of the element and a second capacitor on the opposite side of the torsional axis from the first capacitor, formed by the second section of the element and the second metallic electrode mounted on the substrate below the second section of the element wherein the size of the first and second capacitors is unequal.

2. An accelerometer as recited in claim 1 further comprising an electronic module for processing signals received from said first and second capacitors.

* * * * *